United States Patent [19]
Kim

[11] Patent Number: 6,133,911
[45] Date of Patent: *Oct. 17, 2000

[54] METHOD FOR SELECTING MENUS DISPLAYED VIA TELEVISION RECEIVER

[75] Inventor: Pil Tae Kim, Suwon, Rep. of Korea

[73] Assignee: Samsung Electronics Co., Ltd., Rep. of Korea

[ * ] Notice: This patent issued on a continued prosecution application filed under 37 CFR 1.53(d), and is subject to the twenty year patent term provisions of 35 U.S.C. 154(a)(2).

[21] Appl. No.: 09/004,630

[22] Filed: Jan. 8, 1998

[30] Foreign Application Priority Data

Jan. 8, 1997 [KR] Rep. of Korea ............... 97-266

[51] Int. Cl.[7] .................................................. G06T 11/00

[52] U.S. Cl. ..................... 345/327; 345/339; 345/352; 345/353; 348/564; 348/569; 348/906

[58] Field of Search ................................. 345/340, 353, 345/352, 344, 345, 339, 145, 327, 123–125, 146; 348/569, 563–564, 578, 906

[56] References Cited

U.S. PATENT DOCUMENTS

| | | | |
|---|---|---|---|
| 5,119,080 | 6/1992 | Kajimoto | 345/118 |
| 5,377,303 | 12/1994 | Firman | 704/275 |
| 5,459,831 | 10/1995 | Brewer et al. | 345/356 |
| 5,485,175 | 1/1996 | Suzuki | 345/353 |
| 5,528,263 | 6/1996 | Platzker | 345/156 |
| 5,588,106 | 12/1996 | Habata | 345/340 |
| 5,859,638 | 1/1999 | Coleman et al. | 345/341 |
| 5,870,543 | 2/1999 | Ronning | 395/186 |
| 5,907,323 | 5/1999 | Lawler | 345/327 |
| 5,959,542 | 9/1999 | Ishida | 340/825.44 |

OTHER PUBLICATIONS

Charles Petzold, "Paring Down the Standard Window", PC Magazine v8 n6, Mar. 1989.
A. Pitaksanonkul et al., "Comparison of Quad Trees and 4–D Trees: New Results", IEEE Transaction on Computer–Aided Design of Integrated Circuits and Systems, pp. 1157–1164, Nov. 1989.
Josaille Berger, "Quad–Tree fir Circuit Data Retrieval in Structured Design", IEEE Press, pp. 11–14, Nov. 1985.
P.V. Srinvas et. al., "YAQT: Yet Another Quad Tree", IEEE Press, pp. 302–309, 1991.
Y.S. Kuo, "A Data Structure for Fast Region Searches", IEEE Design and Test of Computers, pp. 20–28, Oct. 1989.

*Primary Examiner*—Raymond J. Bayerl
*Assistant Examiner*—Thomas Joseph
*Attorney, Agent, or Firm*—Dilworth & Barrese

[57] ABSTRACT

A method for selecting menus in a television receiver is provided. In the method, a controller determines if a menu selection command is input by a user to enter a menu selection mode. If the menu selection command is input, the menu selection mode is entered, and a main object is displayed on a screen of the television receiver. Then, the controller determines if a cursor is positioned within a main object region of the main object when the main object is displayed on the screen and determines if a sub-object is associated with the selected main object when the cursor is within the main object region. If the selected main object has a sub-object, the selected main object is erased from the screen, and the sub-object is displayed. Then, the controller determines if the cursor is positioned within a sub-object region of the sub-object when the sub-object is displayed on the screen. When the cursor is positioned within the sub-object region, a sub-object operation is executed. On the other hand, when no sub-object is associated with the selected main object, a main object operation corresponding to the selected main object is executed.

21 Claims, 3 Drawing Sheets

METHOD FOR SELECTING MENUS DISPLAYED VIA TELEVISION RECEIVER

FIELD OF THE INVENTION

The present invention relates to a method for selecting menus displayed via a television receiver. More particular, the invention relates to a method in which menus can be displayed via a television receiver in a diverse format and can be selected regardless of the sequence of the menus.

BACKGROUND OF THE INVENTION

Generally, in conventional television receivers, menus can only be displayed sequentially. Therefore, a certain menu often can only be selected after one or more menus are selected. For example, a conventional television may display a "function selection" menu, a "sound selection" menu, and a "picture selection" menu. Also, in order to display the "picture selection" menu, the "function selection" menu and the "sound selection" menu must be first be sequentially displayed or selected.

Also, if a plurality of menus are displayed on the screen of a television receiver, many remote controls can only move a cursor along an X axis or a Y axis to select a menu. Therefore, if the cursor is located at the upper left portion of the screen, the cursor must first be moved along the X axis and then be moved along the Y axis to select a menu in the lower right portion of the screen. As a result, the coordinates of the menus are determined in advance, and the menus located closest to the cursor must be selected first. In other words, the coordinates of the menu could not be selected by moving a cursor along a diagonal line or a curved line. Thus, the accessing method for selecting menus is such that any arbitrary menu cannot be selected without selecting a prior sequence of the menus. As a result, selecting menus displayed via a conventional television receiver is time consuming and inconvenient.

Also, since the cursor cannot move along a diagonal line or a curved line, the locations at which the menus are placed on the screen of the television are limited. Thus, if a desired menu is disposed diagonally to the cursor, the cursor has to be moved to the menu by sequentially inputting some combination of commands to move the cursor along the X axis and the Y axis in a sequential manner. Thus, accessing the menus is difficult.

In addition, the shapes of the menus are limited to a few types of shapes such as rectangles, squares, etc. Therefore, the manner in which menus are conventionally expressed is limited.

SUMMARY OF THE INVENTION

In order to overcome the above and other disadvantages, an object of the present invention is to provide a method for selecting menus in a television receiver in which the menus at arbitrary coordinates on a television screen can be arbitrarily selected regardless of an inputted sequence. Also, the present invention enables a cursor for selecting the menus to be moved along a diagonal line or a curved line.

In order to achieve the above and other objects, a method for selecting menus in a television receiver is provided. The method comprises the steps of: (a) determining if a menu selection command is input by a user to enter a menu selection mode; (b) entering said menu selection mode and displaying a main object on a screen of said television receiver if said menu selection command is input; (c) determining if a cursor is positioned within a main object region of said main object when said main object is displayed on said screen; (d) altering a color of said main object region to indicate that said main object is a selected main object if said step (c) determines that said cursor is positioned within said main object region; (e) determining if a sub-object is associated with said selected main object if said step (c) determines that said cursor is positioned within said main object region; (f) erasing said selected main object from said screen of said television receiver and displaying a sub-object if said selected main object has a sub-object; (g) determining if said cursor is positioned within a sub-object region of said sub-object when said sub-object is displayed on said screen; (h) altering a color of said sub-object region to indicate that said sub-object is a selected sub-object if said step (g) determines that said cursor is positioned within said sub-object region; (i) executing a sub-object operation corresponding to said selected sub-object if said step (g) determines that said cursor is positioned within said sub-object region; and (j) executing a main object operation corresponding to said selected main object if said step (e) determines that no sub-object is associated with said selected main object.

BRIEF DESCRIPTION OF THE DRAWINGS

The above and other objects and advantages of the present invention will become more apparent by describing in detail the preferred embodiment of the present invention with reference to the attached drawings in which.

DETAILED DESCRIPTION OF THE PREFERRED EMBODIMENT(S)

The following description of the preferred embodiments discloses specific routines, configurations, etc. However, the preferred embodiments are merely examples of the present invention, and thus, the specific components and routines described below are only used to more easily describe such embodiments and to provide an overall understanding of the present invention. Accordingly, one skilled in the art will readily recognize that the present invention is not limited to the specific components and routines described below. Furthermore, the descriptions of various features and structures of the present invention which would have been known to one skilled in the art are omitted for the sake of clarity and brevity.

An embodiment of the format of the menus and the method in which they are selected will be described below in conjunction with FIGS. 1 to 4.

Figure 1:
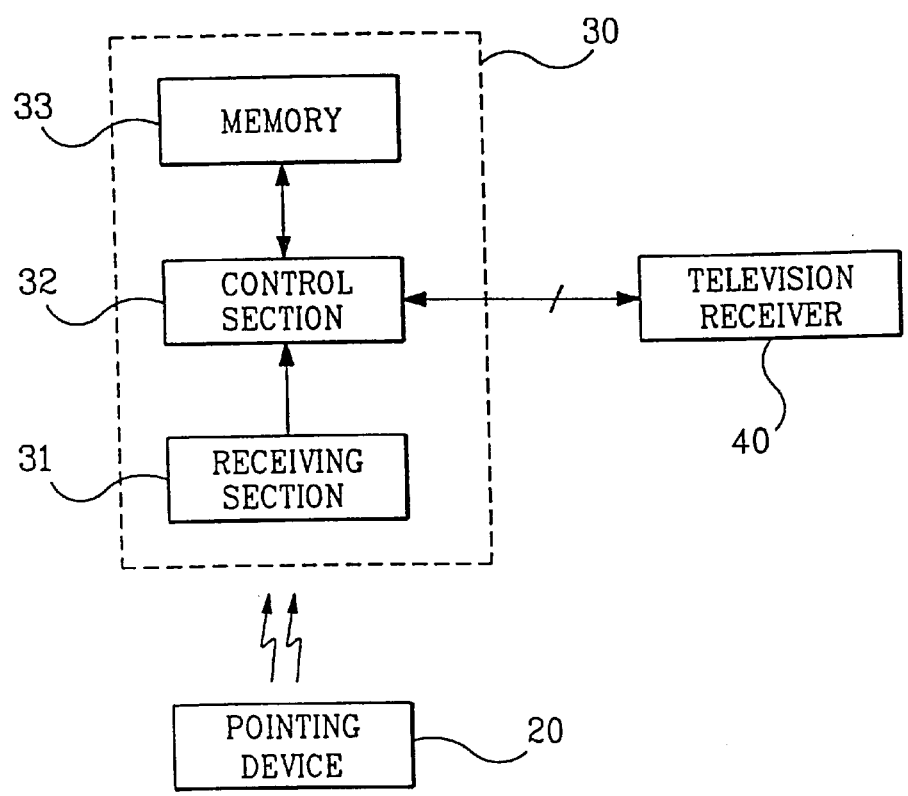
FIG. 1 is a block diagram of an apparatus employing a method for selecting menus according to one embodiment the present invention.

An illustrative example of an apparatus which performs the menu selection method of the present invention is shown in FIG. 1. The apparatus comprises a pointing device 20, a pointing interface device 30, and a television receiver 40. The television receiver 40 is capable of displaying menus on its screen, and the pointing device 20 generates cursor movement commands and other commands to select menus on the screen. The pointing interface device 30 inputs the movement commands and other commands from the pointing device 20 and generates control signals for executing one or more of the menus displayed on the screen of the receiver 40.

The pointing interface device 30 comprises a receiving section 31, a control section 32, and a memory 33. The memory 33 stores and sets the X and Y coordinates for the various menus on the screen of the television receiver 40 and stores menu data corresponding the coordinates. The receiving section 31 receives the commands from the pointing device 20 and converts such commands into output signals which indicate various characteristics such as the coordinates of the cursor 14, whether or a selection command has been input, etc. The control section 32 controls various operations of the apparatus. For example, the control section 32 compares the cursor coordinates output from the receiving section 31 with the coordinates stored in the memory 33 and outputs menu data which corresponds to such coordinates to the television receiver 40 together with control signals.

Figure 2:
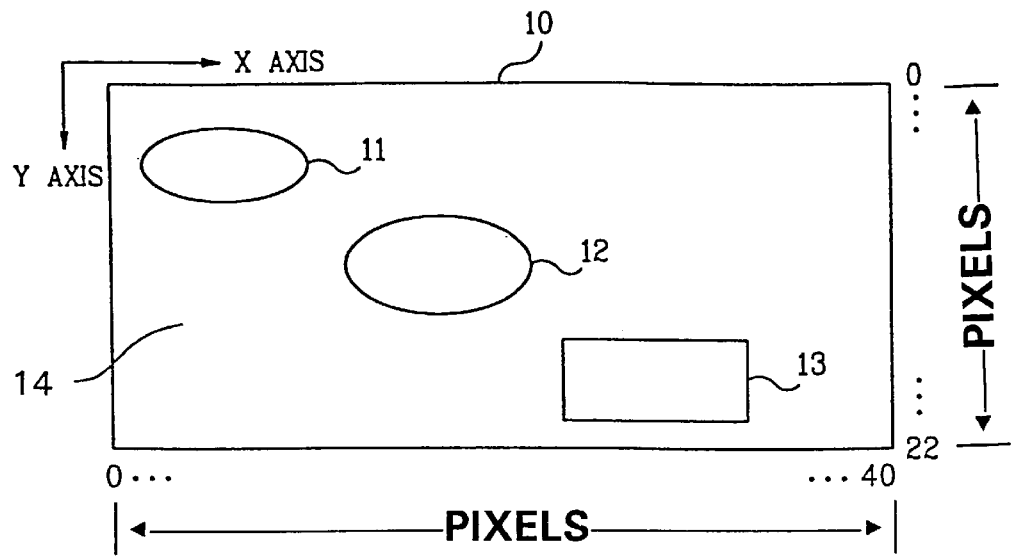
FIG. 2 illustrates menus displayed on a screen of television receiver according to one embodiment of the present invention.
Figure 3:
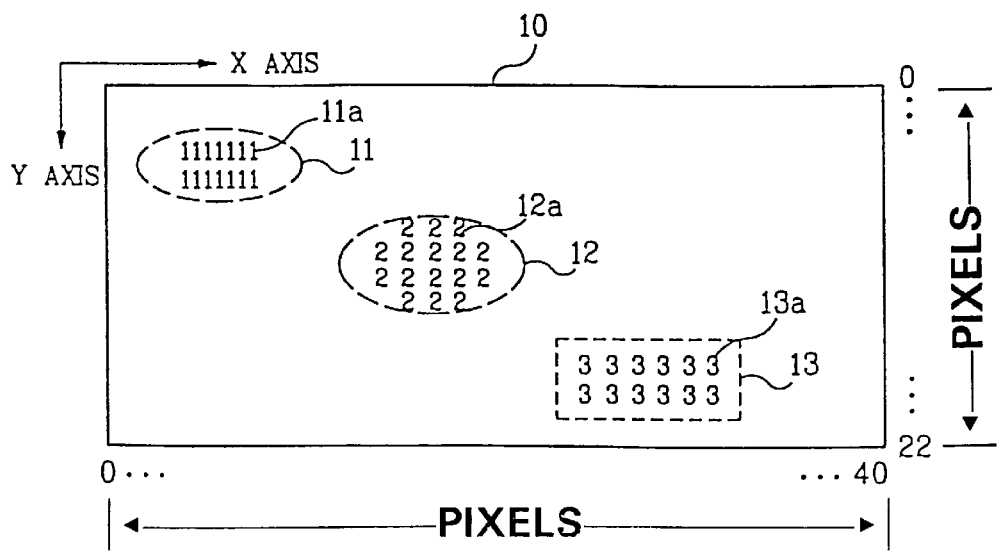
FIG. 3 illustrates the menus shown in FIG. 2 having serial numbers assigned to them.

FIG. 2 illustrates an example of how various menus are displayed on the screen of television receiver 40 according to an embodiment of the present invention. FIG. 3 illustrates the menus having serial numbers assigned to them.

As shown in these figures, the screen of the television receiver 40 contains rows and columns of pixels which are arranged along an X axis (i.e. arranged in a lateral direction) and along a Y axis (i.e. arranged in a longitudinal direction). The lengths of the X axis and Y axis are determined based on the sizes of the menus and the resolution at which they are to be displayed. The lengths of the X axis and Y axis are expressed in a unit which is obtained by dividing the axes by a number N.

For example, if the screen of the television receiver 40 has a width and height which equal 1280×720, the size of the screen for accommodating the menu may be calculated to be 40 pixels×22 pixels. In particular, the width and height of the screen can be divided by an arbitrary number (e.g. 32) such that the portion of the screen for accommodating the menu has a width which equals (1280/32)=40 pixels and has a height which equals (720/32)=22 pixels. Thus, the lengths of the X axis and the Y axis can be decided.

In the above example, the dimensions of the screen are divided by the arbitrary number 32, but such number could be replaced by another number (e.g. 16). The reason why the size or resolution of the screen is reduced for displaying the menus is to reduce the amount of the memory 33 needed for storing the menus and to reduce the time required to reproduce and display the menus on the screen. In other words, rather than using the total picture for accommodating the menus, the picture is first reduced to a fraction 1/N to generate a reduced picture, and then the reduced picture is expanded N times when it is reproduced. If the memory capacity is sufficiently large, N may be set to 1, and thus, the menus may have a high resolution.

If more than one menu (e.g., three menus) are to be expressed on a picture 10 which is 1/N of the size of the screen of the television receiver 40, serial numbers are respectively assigned to the menus. For example, if a "function selection" menu, a "picture selection" menu, and "sound selection" menu are to be displayed on the picture 10, they may be respectively assigned the serial numbers 1, 2, and 3. Then, the menus and their corresponding serial numbers 1, 2, and 3 are assigned to various coordinates 11*a*, 12*a*, and 13*a*, and the serial numbers 1, 2, and 3 relate to various regions 11, 12 and 13 which form a plurality of groups at particular positions on the television screen. Each of the menus allocated to the particular positions and each of the groups of serial numbers 1, 2, and 3 is called an object. The shape and position of the objects can be altered in various manners in accordance with the X and Y axes. When the menus are displayed on the screen, a cursor 14 is also displayed and can be moved by the inputting appropriate commands via the pointing device 20. The pointing device 20 may be any type of controller (e.g. a mouse), and the cursor 14 can have virtually any shape (e.g. an arrow).

In the menu layout on the television receiver 40, the respective menus (i.e. the respective objects and the related data) are stored in advance in the data base in the memory 33. The data base contains two-dimensional coordinates of X and Y axes, the serial numbers 1, 2, and 3 of the respective objects, the items related to the selection of the objects, and types of commands and contents of commands executed in accordance with the selection of the objects.

The constitution of menus on the television receiver 40 and the manner in which a menu is selected will be described below. As previously described, a user inputs commands via the pointing device 20 to move the cursor 14 along the X and Y axes of the screen. As the cursor 14 moves onto the coordinates assigned to one of the objects on the screen, the receiving section 31 outputs certain signals, and the control section 32 recognizes that the cursor 14 has moved onto the coordinates of the object and identifies the serial number 1, 2, or 3 associated with the region 11, 12, or 13 of the object. Such process is the manner by which a menu is selected. Afterwards, the control section 32 evaluates the data contained in the data base which corresponds to the selected menu. If the data corresponds to a command to be executed or if an external command is input via the pointing device 20, the appropriate command is executed.

Figure 4:
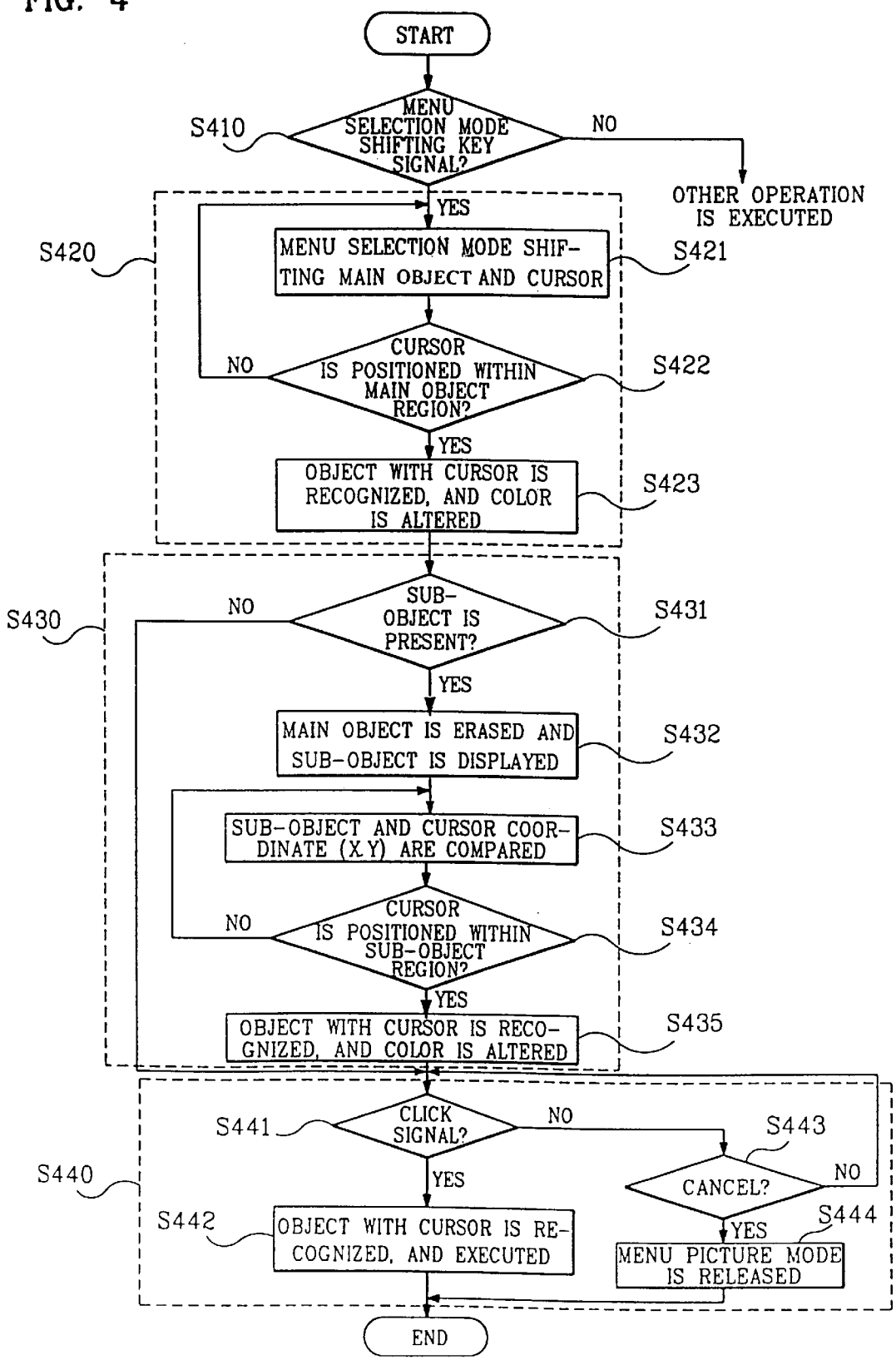
FIG. 4 is a flow chart of a method for selecting menus displayed via a television receiver according to one embodiment of the present invention.

A method for selecting menus in the television receiver according to one embodiment of the present invention will be described below in conjunction with FIG. 4. As shown in the figure, the control section 32 determines if the user has input a command via the pointing device 20 to place the television receiver 40 in a menu selection mode (step S410). If such a command is not input, another operation is executed. On the other hand, if the command is input, the television receiver 40 is switched to the menu selecting mode, and the coordinates of the main object (or main objects) are compared with the X and Y coordinates of the cursor 14 (step S421).

Then, the control section 32 determines if the cursor 14 is positioned within one of the regions 11, 12, or 13 of the main objects (step S422). If the cursor 14 not positioned within one of the regions 11, 12, or 13, step S421 is repeated, and the coordinates of the cursor 14 and main objects are again compared. If the cursor 14 is located within one of the regions 11, 12, or 13 of a main object, the control section 32 recognizes the serial number 1, 2, or 3 of the region 11, 12, or 13 in order to recognize the kind of the menu expressed by the main object. In addition, the color of the main object is changed to a predetermined color to visually inform the user that the main object has been selected (step S423).

Then, the control section 32 determines if the selected main object has a sub-object (step S431). If the main object has one or more sub-objects, the main object is erased from the picture 10 of the television receiver 40, and the sub-object or sub-objects are displayed (step S432). Then, the control section 32 compares the coordinates of the sub-object or sub-objects with the coordinates of the cursor 14

(step S433). Then, the control section 32 determines if the cursor 14 is positioned within one of the regions of the sub-objects based on such comparison (step S434). If the cursor 14 is not positioned within one of the regions, step S433 is repeated, and the coordinates of the cursor 14 and sub-objects are again compared. If the cursor 14 is positioned within one of the regions, the sub-object within which the cursor 14 is positioned is recognized, the sub-object is selected, and the color of the sub-object is changed into a predetermined color (step S435).

Then, the control section 32 determines if an execution command or selection command (e.g. clicking a button of a mouse, etc.) has been input via the pointing device 20 and receiving section 31 (step S441). Also, if the control section 32 determines that a sub-object is not present in step S431, the routine immediately proceeds to step S441, and the control section 32 determines if an execution or selection command has been input.

If an execution or selection command has been input, the control section 32 reads the serial number of the object corresponding to the region in which the cursor 14 is positioned. Thus, the menu to which the object corresponds is recognized, and an execution instruction is output to the television receiver 40 to instruct the receiver 40 to perform a particular function (step S442). On the other hand, if an execution or selection command has not been input, the control section 32 determines if a cancel command has been input via the pointing device 20 (step S443). If a cancel command has been input, the menu selection mode terminates (step S444). On the other hand, if a cancel command has not been input, the routine returns to step S441, and the control section 32 determines if an execution or selection command has been input.

Also, in step S443, instead of or in addition to determining if a cancel command has been input, the control section 32 may determine if a certain time period has elapsed. Thus, if an execution or selection command has not been input within the certain time period, the routine proceeds to step S444, and the menu selection mode is terminated.

According to the present invention as described above, the coordinates of the cursor 14 are compared with data that is stored in advance in a data base in order to recognize a selected object. After such comparison, the relevant command is executed, and therefore, the television menus can be selected regardless of the inputted sequence. Furthermore, the cursor 14 can be moved along a diagonal line or a curved line.

The previous description of the preferred embodiments is provided to enable a person skilled in the art to make or use the present invention. Moreover, various modifications to these embodiments will be readily apparent to those skilled in the art, and the generic principles defined herein may be applied to other embodiments without the use of inventive faculty. Therefore, the present invention is not intended to be limited to the embodiments described herein but is to be accorded the widest scope as defined by the claims.

What is claimed is:

1. A method for selecting menus in a television receiver, comprising the steps of:
   (a) determining if a menu selection command is input by a user to enter a menu selection mode;
   (b) entering said menu selection mode and displaying one or more main menus on a screen of said television receiver if said menu selection command is input;
   (c) determining if a cursor is positioned within one of the one or more main menus, wherein a serial number corresponds to each of said one or more main menus, and said serial number is pre-assigned to at least one coordinate position within said corresponding main menu, wherein a serial number is identified when said cursor is positioned on at least one coordinate position to which said identified serial number is pre-assigned, and wherein said identified serial number enables the determination that the cursor is positioned within the identified serial number's corresponding main menu;
   (d) altering a color of a main menu to indicate that said main menu is a selected main menu if step (c) determines that said cursor is positioned within said main menu;
   (e) determining if one or more sub-menus are associated with said selected main menu if step (c) determines that said cursor is positioned within said main menu;
   (f) erasing said selected main menu from said screen of said television receiver and displaying one or more sub-menus if said selected main menu has one or more sub-menus;
   (g) determining if said cursor is positioned within one of the one or more sub-menus when said one or more sub-menus are displayed on said screen;
   (h) altering a color of a sub-menu to indicate that said sub-menu is a selected sub-menu if step (g) determines that said cursor is positioned within said sub-menu;
   (i) executing a sub-menu operation corresponding to said selected sub-menu if step (g) determines that said cursor is positioned within said sub-menu; and
   (j) executing a main menu operation corresponding to said selected main menu if step (e) determines that no sub-menu is associated with said selected main menu.

2. The method as claimed in claim 1, wherein step (c) comprises the sub-steps of:
   (c1) comparing coordinates of said one or more main menus with coordinates of said cursor; and
   (c2) determining that said cursor is positioned with a main menu if said cursor coordinates are contained within said main menu coordinates.

3. The method as claimed in claim 2, wherein step (c) further comprises the sub-step of:
   (c3) repeating steps (c1) and (c2) until said cursor is positioned within a main menu.

4. The method as claimed in claim 1, wherein step (g) comprises the sub-steps of:
   (g1) comparing coordinates of said one or more submenus with coordinates of said cursor; and
   (g2) determining that said cursor is positioned within a sub-menu if said cursor coordinates are contained within said sub-menu coordinates.

5. The method as claimed in claim 4, wherein said step (g) further comprises the sub-step of:
   (g3) repeating steps (g1) and (g2) until said cursor is positioned within a sub-menu.

6. The method as claimed in claim 1, wherein step (i) comprises the sub-steps of:
   (i1) determining if an execution command is input by a user if step (g) determines that said cursor is positioned within said sub-menu;
   (i2) executing said sub-menu operation if said execution command is input by said user.

7. The method as claimed in claim 6, wherein said step (i) further comprises the sub-step of:
   (i3) exiting said menu selection mode if an execution command is not input and a cancel command is input by said user.

8. The method as claimed in claim 6, wherein said step (i) further comprises the sub-step of:
(i3) exiting said menu selection mode if an execution command is not input within a certain period of time.

9. The method as claimed in claim 1, wherein said step (j) comprises the sub-step of:
(j1) determining if an execution command is input by a user if said step (e) determines that no sub-menu is associated with said selected main menu; and
(j2) executing said main menu operation if said execution command is input by said user.

10. The method as claimed in claim 9, wherein said step (j) further comprises the sub-step of:
(j3) exiting said menu selection mode if an execution command is not input and a cancel command is input by said user.

11. The method as claimed in claim 9, wherein said step (j) further comprises the sub-step of:
(j3) exiting said menu selection mode if an execution command is not input within a certain period of time.

12. The method as claimed in claim 6, wherein step (i2) further comprises the sub-steps of:
(i2a) determining a serial number corresponding to said selected sub-menu when said execution command is input; and
(i2b) executing said sub-menu operation based on said serial number, wherein said serial number identifies said sub-menu with said sub-menu operation.

13. The method as claimed in claim 9, wherein step (j2) further comprises the sub-steps of:
(j2a) determining a serial number corresponding to said selected main menu when said execution command is input; and
executing said main menu operation based on said serial number, wherein said serial number identifies said main menu with said main menu operation.

14. The method as claimed in claim 1, wherein said screen of said television receiver forms a coordinate system to establish at least one main menu and wherein said at least one main menu is stored in a memory based on said coordinate system.

15. The method as claimed in claim 14, wherein a lateral and longitudinal dimension of a picture of said television receiver is divided by a number N to accommodate said at least one main menu, wherein said number N is greater than zero.

16. The method as claimed in claim 1, wherein said serial number identifies said main object command to be executed when said cursor is positioned within said main menu.

17. The method as claimed in claim 15, wherein said number N is greater than one.

18. The method as claimed in claim 14, wherein said at least one main menu comprises a first main menu and at least a second main menu.

19. A method for selecting menus in a television receiver, comprising the steps of:
(a) determining if a menu selection command is input by a user to enter a menu selection mode;
(b) entering said menu selection mode and displaying one or more main menus on a screen of said television receiver if said menu selection command is input;
(c) determining if a cursor is positioned within one of the one or more main menus when said one or more main menus are displayed on said screen, and designating a main menu as a selected main menu when said cursor is positioned within said main menu, comprising the steps of:

(c1) pre-assigning a serial number to at least one coordinate position within a main menu, said pre-assigned serial number corresponding to the main menu within which the at least one coordinate position is located; and
(c2) identifying a pre-assigned serial number when said cursor is positioned on at least one coordinate position to which said pre-assigned serial number is pre-assigned, wherein said identified serial number enables the determination that the cursor is positioned within the identified serial number's corresponding main menu;

(d) determining if one or more sub-menus are associated with said selected main menu;
(e) erasing said selected main menu from said screen of said television receiver and displaying one or more sub-menus if said selected main menu has one or more sub-menus;
(f) determining if said cursor is positioned within a sub-menu when said one or more sub-menus are displayed on said screen and designating a sub-menu as a selected sub-menu when said cursor is positioned within said sub-menu;
(g) executing a sub-menu operation corresponding to said selected sub-menu if said step (f) determines that said cursor is positioned within said sub-menu; and
(i) executing a main menu operation corresponding to said selected main menu if said step (d) determines that no sub-menu is associated with said selected main menu.

20. A method for choosing and executing operations in a television receiver, said method using menu selection of said operations on a screen of said television receiver, said screen forming a coordinate system, said menu selection including main menus, sub-menus, and a cursor, said cursor being moved about the screen by a user manipulating a remote control device, comprising the steps of:
(a) dividing a horizontal and a vertical length of said coordinate system by an integer N to find a memory storage size for at least one menu;
(b) storing said at least one menu based on the memory storage size found in step (a);
(c) assigning a serial number to each menu, said serial number being assigned to each coordinate position within said menu;
(d) determining if a menu selection command is input by a user;
(e) entering a menu selection mode and displaying one or more main menus on the screen of said television receiver if said menu selection command is input;
(f) determining if the coordinates of the cursor overlap at least one position coordinate that has been assigned a serial number;
(g) selecting and highlighting a main menu associated with a serial number, if it is determined that the cursor overlaps said serial number;
(h) determining if one or more sub-menus are associated with said selected main menu of step (g);
(i) erasing the selected main menu from the screen of the television receiver and displaying one or more sub-menus if it is determined that said selected main menu has said one or more sub-menus in step (h);
(j) determining if the coordinates of the cursor overlap at least one position coordinate that has been assigned a serial number;

(k) selecting and highlighting a sub-menu associated with a serial number, if it is determined that the cursor overlaps said serial number;

(l) executing a sub-menu operation corresponding to said selected sub-menu if step (k) determines that the cursor overlaps a serial number; and (m) executing a main menu operation corresponding to said selected main menu if step (h) determines that no sub-menu is associated with said selected main menu.

21. The method as claimed in claim 20, further comprising the steps of:

repeating steps (f) and (g) until the cursor overlaps at least one position coordinate that has been assigned a serial number; and repeating steps (j) and (k) until the cursor overlaps at least one position coordinate that has been assigned a serial number.

\* \* \* \* \*